US009137016B2

(12) United States Patent
Blanchard et al.

(10) Patent No.: US 9,137,016 B2
(45) Date of Patent: Sep. 15, 2015

(54) KEY PAIR UPDATES BASED ON DIGITAL SIGNATURE STATES

(71) Applicant: Hewlett-Packard Development Company, L.P., Fort Collins, CO (US)

(72) Inventors: Todd Eric Blanchard, Vancouver, WA (US); Rowdy K Webb, Portland, OR (US); Laurent Pizot, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 59 days.

(21) Appl. No.: 13/923,340

(22) Filed: Jun. 20, 2013

(65) Prior Publication Data

US 2014/0380055 A1   Dec. 25, 2014

(51) Int. Cl.
*H04L 9/08* (2006.01)
*H04L 9/32* (2006.01)

(52) U.S. Cl.
CPC ............ *H04L 9/0891* (2013.01); *H04L 9/0825* (2013.01); *H04L 9/3247* (2013.01)

(58) Field of Classification Search
CPC ....... H04L 9/0891; H04L 9/32; H04L 9/0825; H04L 9/3247
USPC .......................................................... 713/171
See application file for complete search history.

(56) References Cited

U.S. PATENT DOCUMENTS

| 5,761,306 | A  | * | 6/1998  | Lewis ........................... 380/282 |
| 6,856,430 | B1 | * | 2/2005  | Gase .............................. 358/1.9 |
| 6,978,017 | B2 |   | 12/2005 | Wiener et al. |
| 7,085,386 | B2 |   | 8/2006  | Audebert et al. |
| 7,522,732 | B2 | * | 4/2009  | Whitehead .................... 380/286 |
| 8,296,579 | B2 |   | 10/2012 | Piwonka et al. |
| 2002/0184619 | A1 | * | 12/2002 | Meyerson ...................... 717/173 |
| 2005/0021968 | A1 | * | 1/2005  | Zimmer et al. ............... 713/176 |
| 2005/0128520 | A1 | * | 6/2005  | Glickman .................... 358/1.15 |
| 2006/0101454 | A1 | * | 5/2006  | Whitehead .................... 717/168 |
| 2006/0143600 | A1 | * | 6/2006  | Cottrell et al. ............... 717/168 |
| 2008/0046877 | A1 | * | 2/2008  | Ford .............................. 717/168 |
| 2008/0279387 | A1 | * | 11/2008 | Gassoway ..................... 380/279 |
| 2009/0063860 | A1 |   | 3/2009  | Barnett et al. |
| 2013/0318357 | A1 | * | 11/2013 | Abraham et al. ............. 713/176 |

OTHER PUBLICATIONS

"Key Update and the Complete Story on the Need for Two Key Pairs," Aug. 2000, Entrust, https://www.netrust.net/docs/whitepapers/2keypairs11.pdf.

* cited by examiner

*Primary Examiner* — Joseph P Hirl
*Assistant Examiner* — J. Brant Murphy
(74) *Attorney, Agent, or Firm* — Hewlett-Packard Patent Department

(57) ABSTRACT

Example embodiments relate to updating key pairs based on digital signature states. In example embodiments, first credentials that are generated using a first private key may be sent to a user computing device, where the first private key is associated with a first public key. At some stage, second credentials that are generated using the first private key and a second private key are sent to the user computing device, where the second credentials specify that the first private key is deprecated, and where the user computing device authenticates the second credentials using the first public key. In response to receiving confirmation that a firmware upgrade is installed a number of user computing devices such that an upgrade threshold is satisfied, the first private key may be deactivated. The firmware upgrade may be provided in response to receiving a firmware upgrade request from the user computing device.

15 Claims, 4 Drawing Sheets

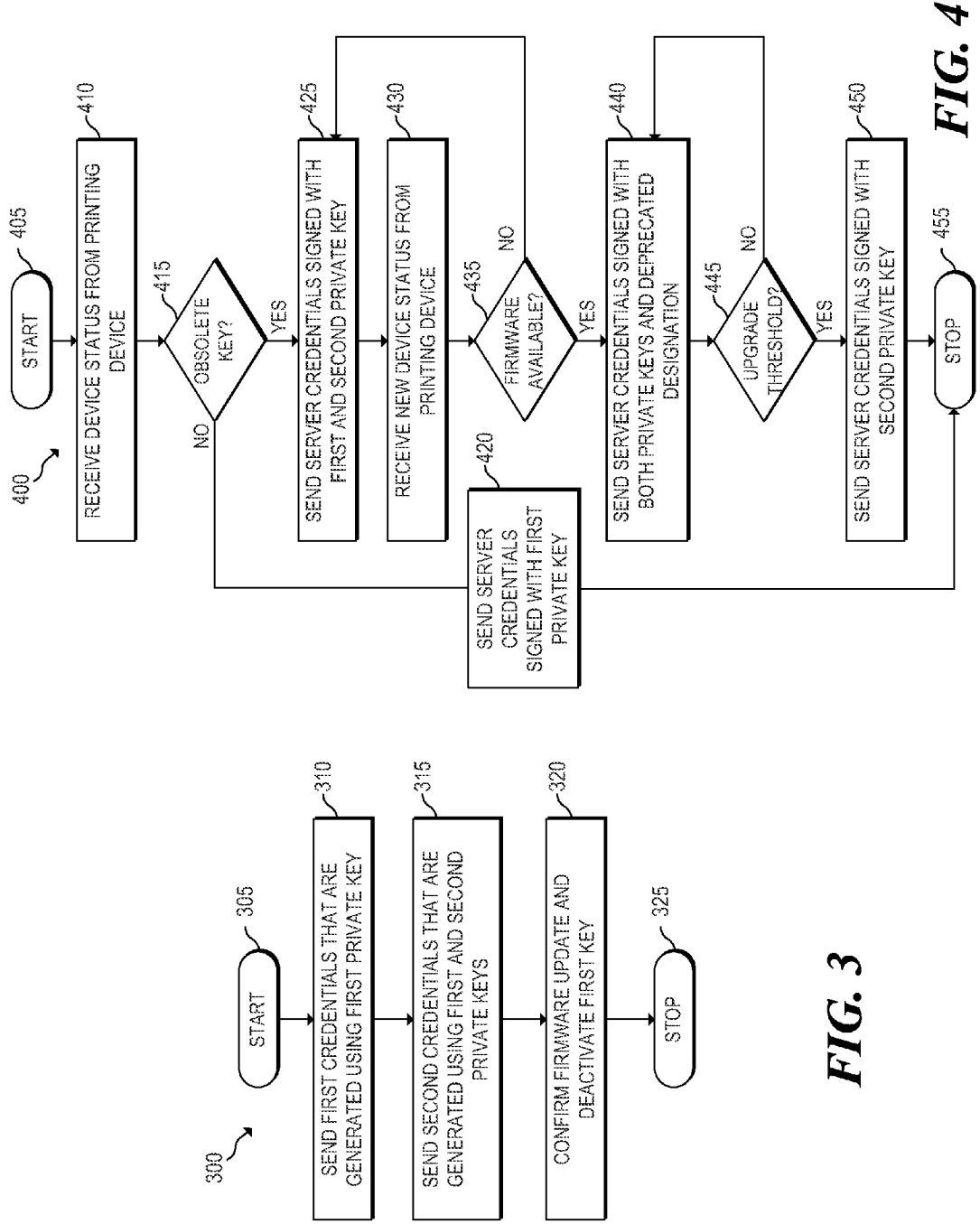

KEY PAIR UPDATES BASED ON DIGITAL SIGNATURE STATES

BACKGROUND

In some scenarios, a printing device may use public-key cryptography (e.g., RSA, etc.) to authenticate print credentials from a print server. Specifically, the printing device uses a public key to authenticate print credentials, which are signed by the print server using a private key. In this case, a single public key is embedded in the printer firmware.

BRIEF DESCRIPTION OF THE DRAWINGS

The following detailed description references the drawings, wherein:

FIG. 3 is a flowchart of an example method for execution by a server computing device for updating key pairs based on digital signature states;

FIG. 4 is a flowchart of an example method for execution by a print server for updating firmware on a print device during a key pair replacement.

DETAILED DESCRIPTION

As detailed above, printing devices may store a public key for authenticating communications from a print server. If the private key on the print server is compromised, the public key should be replaced on the printing device with a new public key for authenticating communications generated with a new private key on the print server. Typically, the public key is stored in firmware of the printing device. Accordingly, a firmware upgrade of the printing device is performed to replace the public key with a new public key. In some cases, the printing device may be unable to authenticate credentials until the firmware upgrade is installed.

Example embodiments disclosed herein provide key pair updates based on digital signature states that facilitate the continued operation of a printing device during the update process. For example, in some embodiments, a server computing device sends first credentials that are generated using a first private key to a user computing device, where the first private key is associated with a first public key. At this stage, the server computing device sends second credentials that are generated using the first private key and a second private key to the user computing device, where the second credentials specify that the first public key is deprecated. The user computing device authenticates the second credentials using the first public key. An upgrade server provides a firmware upgrade that includes a second public key to the user computing device in response to receiving a firmware upgrade request from the user computing device, where the second public key is associated with the second private key. In response to receiving confirmation that the firmware upgrade is installed on the user computing device and a plurality of user computing devices such that an upgrade threshold is satisfied, the server computing device deactivates the first private key.

In this manner, examples disclosed herein provide key pair updates without interrupting services provided to the user computing device. Specifically, because use of the original key pair is continued after deprecation, the user computing devices have a transitional period during which both the original key pair and a new key pair are active, which allows for the firmware upgrade to be rolled out without interrupting service. Further, because deactivated key pairs can be removed from the server computing device and the user computing devices, the system is secured from future security threats that may result from a compromised key pair.

Figure 1:
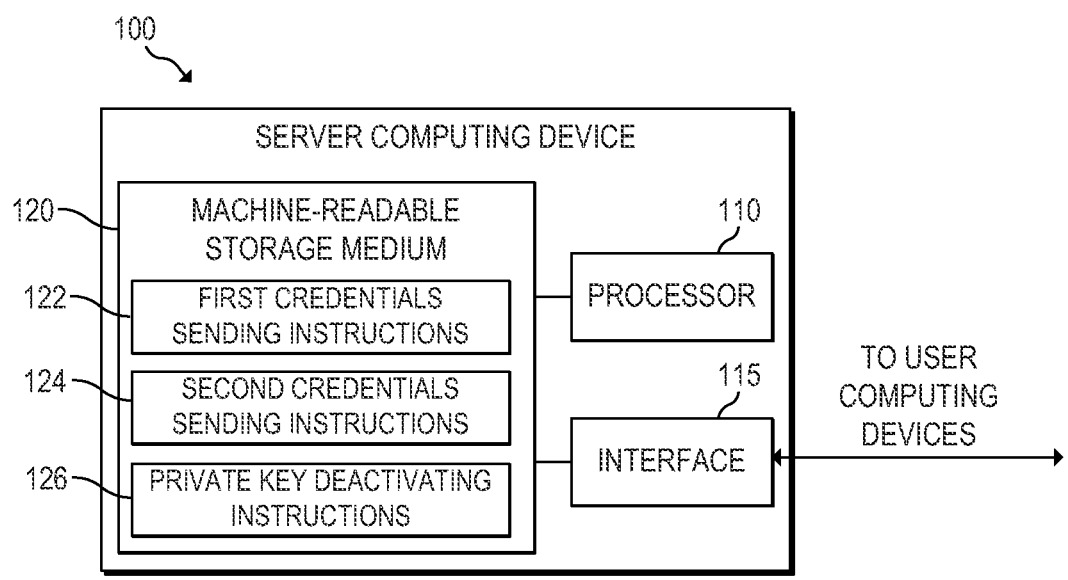
FIG. 1 is a block diagram of an example server computing device for updating key pairs based on digital signature states.

Referring now to the drawings, FIG. 1 is a block diagram of an example server computing device 100 for updating key pairs based on digital signature states. Server computing device 100 may be any computing device accessible to user computing devices, such as printing devices 260A, 260N of FIG. 2. In the embodiment of FIG. 1, server computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable updating key pairs based on digital signature states, as described below. As an alternative or in addition to retrieving and executing instructions, processor 110 may include one or more electronic circuits comprising a number of electronic components for performing the functionality of one or more of instructions 122, 124, 126.

Interface 115 may include a number of electronic components for communicating with a printing device. For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with the printing devices. Alternatively, interface 115 may be a wireless interface, such as a wireless local area network (WLAN) interface or a near-field communication (NFC) interface. In operation, as detailed below, interface 115 may be used to send and receive data, such as a print data and subscription data, to and from corresponding interfaces of printing devices.

Machine-readable storage medium 120 may be any electronic, magnetic, optical, or other physical storage device that stores executable instructions. Thus, machine-readable storage medium 120 may be, for example, Random Access Memory (RAM), Read-Only Memory (ROM), Electrically-Erasable Programmable Read-Only Memory (EEPROM), flash memory, a storage drive, an optical disc, and the like. As described in detail below, machine-readable storage medium 120 may be encoded with executable instructions for updating key pairs based on digital signature states.

First credentials sending instructions 122 may send first credentials to a user computing device. Credentials may authorize a user computing device to provide services for a user. For example, print credentials may be sent to a printing device to authorize the use of printing services. In this example, the print credentials may include a remaining page count describing the number of pages that the printing device is authorized to print. Server computing device 100 may manage the authorization of services provided by a number of user computing devices. In this case, first credentials sending instructions 122 may send credentials to each of the user computing devices, where each of the credentials is associated with a public-private key pair for encoding the credentials. The private key may be stored on the server computing device 100, and the public key may be stored in firmware of the user computing device. When the first credentials are generated by the server computing device 100, the first credentials are encoded using the private key such that the user computing device may verify the origin of the first credentials by using the public key.

Public-key cryptography is a cryptographic technique that uses a private key and a public key (i.e., the private key is associated with the public key). In this example, the private key is maintained on server computing device 100 and is not shared with any user computing devices. The private key is used to sign messages from server computing device 100, and the public key is used by the user computing devices to authenticate the messages. The public key can be made available to all user computing devices without compromising the security of the private key. By authenticating a message, a user computing device ensures that the message originated from server computing device 100 and was not tampered with by an intervening device.

Second credentials sending instructions 124 may send subsequent credentials to a user computing device. The subsequent credentials sent to the user computing device may be encoded using multiple key pairs. Specifically, the subsequent credentials may be signed with a first private key and a second private key. In this case, the first private key may be a key that is designated for eventual deactivation, and the second private key may be a replacement key for future credentials transmitted from server computing device 100. For example, second credentials sending instructions 124 may initiate sending credentials signed with multiple private keys in response to determining that a current private key is compromised. In this example, credentials signed with multiple private keys may initially be provided for a period of time before the current private key is designated as deprecated. The designation of deprecated may act as a notification to user computing devices that a firmware upgrade with a new key pair is available at an upgrade server, After receiving credentials with a private key that is designated as deprecated, the user computing devices may obtain the firmware upgrade from the upgrade server, where the firmware upgrade includes a replacement public key that can be used to verify credentials signed with the replacement private key.

Private key deactivating instructions 126 may deactivate a deprecated private key in response to determining that an upgrade threshold of user computing devices have installed a firmware upgrade from the upgrade server. For example, the deprecated private key may be deactivated after 90% of known user computing devices have installed the update for a new key pair. In this example, deactivating the deprecated private key ensures that the key is no longer used to sign credentials for server computing device 100. In some cases, the deprecated private key may also be destroyed or otherwise removed from server computing device 100.

Figure 2:
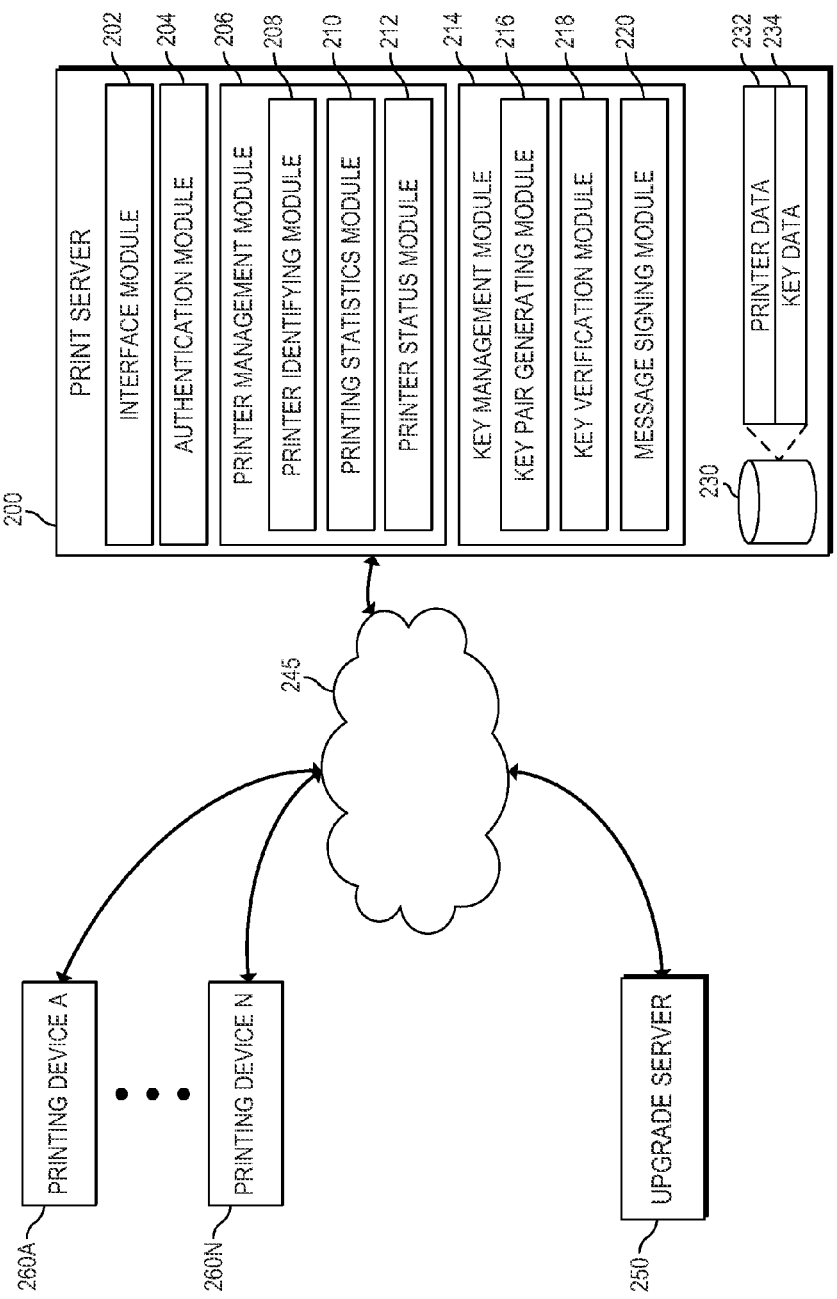
FIG. 2 is a block diagram of an example print server in communication with printing devices for updating key pairs based on digital signature states.

FIG. 2 is a block diagram of an example an example print server 200 in communication with upgrade server 250 and printing devices 260A, 260N for updating key pairs based on digital signature states. As illustrated in FIG. 2 and described below, print server 200 may communicate with printing devices 260A, 260N to provide key pair updates for signing and validating credentials from print server 200.

As with server computing device 100 of FIG. 1, print server 200 may be any server accessible to printing device 200 over a network 245 (e.g., Internet, Intranet, local network, etc.) that is suitable for executing the functionality described below. As detailed below, print server 200 may include a series of modules 202-218 for providing credentials for authorizing print services to printing devices 260A, 260N.

Interface module 202 may manage communications with printing devices 260A, 260N. Specifically, interface module 202 may initiate connections with printing devices 260A, 260N and then send credentials to or receive status information from printing devices 260A, 260N. Interface module 202 may also process authorization of printing devices 260A, 260N to access print server 200. Specifically, interface module 202 may receive unique print device ID's from printing devices 260A, 260N and request that authentication module 204 determine whether printing devices 260A, 260N are properly registered with print server 200. If the printing devices 260A, 260N are properly registered, interface module 204 may then allow the printing devices 260A, 260N to communicate with the other modules of print server 200.

Printer management module 206 may manage access to printing services for printing devices 260A, 260N. Although the components of printer management module 206 are described in detail below, additional details regarding an example implementation of printer management module 206 are provided above with respect to instructions 122 and 124 of FIG. 1.

Printer identifying module 208 may identify printing devices 260A, 260N based on printer identifiers. For example, printing devices 260A, 260N may provide status information that includes printer identifiers, where the printing device associated with the status information is identified based on a corresponding printer identifier. Print identifying module 208 may also identify printing devices 260A, 260N for sending credentials. Specifically, credentials may be provided to each of the printing devices 260A, 260N on a periodic basis to update a quantity of printing services that the printing devices 260A, 260N are authorized to provide. The quantity of printing services that the printing devices 260A, 260N are authorized to provide may be determined as discussed below with respect to the printing statistics module 210.

Printing statistics module 210 may process status information received from printing devices 260A, 260N to determine printing statistics. Status information provided by a printing device 260A, 260N may include, but are not limited to, detected printing fluid remaining in a current fluid container (e.g., toner cartridge, ink cartridge, etc.), pages printed using the current fluid container, total pages printed, date and time previous status information was provided by the printing device 260A, 260N, pages printed since providing previous status information, a fluid subscription identifier, firmware version, etc. The status information may be used to determine printing statistics such as an amount of printing services (e.g., pages to print) that a printing device 260A, 260N is authorized to provide.

Printer status module 212 may determine the status of printing devices 260A, 260N. A printer status may describe the current state of a printer device's 260A, 260N fluid subscription and connectivity, where connectivity may be determined based on whether the printing device 260A, 260N has provided status information within a predetermined time period (e.g., within the last week). A fluid subscription may describe a schedule for providing replacement fluid cartridges to a printing device 260A, 260N and may be deactivated if, for example, a user of the printing device 260A, 260N fails to pay his subscription fees.

Key management module 214 may manage cryptography for communication with printing devices 260A, 260N, Although the components of key management module 214 are described in detail below, additional details regarding an example implementation of key management module 214 are provided above with respect to instructions 126 of FIG. 1.

Key pair generating module 216 may generate key pairs that are used to perform public key cryptography with a printing device 260A, 260N. Specifically, a public key that is provided to the printing device 260A, 260N and a private key that is stored on print server 200 as key data 234 may be generated. In this case, messages from print server 200 are signed with the private key, where the printing devices 260A, 260N use the public key to verify that the messages were provided by print server 200. Key pair generating module 216 may generate key pairs after a private key stored on print server 200 is compromised. In this case, an administrator may initiate the generation of the key pairs, where a schedule is specified for (1) generating the new key pair; (2) deprecating a compromised private key; and (3) transitioning to the use of the new key pair.

Key verification module 218 may determine the status of a key pair of a public key included in status information from a printing device 260A, 260N. Specifically, key verification module 218 may determine that the status of the key pair is active, pending deprecation, deprecated, or inactive. A key pair is active if it is currently being used to encode messages from print server 200 and there are no plans to deprecate the public key. A key pair is pending deprecation if it is currently being used to encode messages from print server 200 and its public key is scheduled to be deprecated within a predetermined time period. A key pair is deprecated if it is currently being used to simultaneously encode messages from print server 200 with a new key pair and the encoded messages designate the original key pair as deprecated. A key pair is inactive if is no longer used to encode messages from print server 200.

Message signing module 220 may sign credentials with a private key before the credentials are provided to a printing device 260A, 260N. A number of the printing devices 260A, 260N may be associated with a key pair of the private key, where the printing devices 260A, 260N verify the credentials using a corresponding public key. If a current key pair is designated as pending deprecation or deprecated, message signing module 220 may sign credentials with both a deprecated private key of the current key pair and a replacement private key from a new key pair. After the status of the current key pair is changed to inactive, message signing module 220 may begin signing credentials with the replacement private key.

Storage device 230 may be any hardware storage device for maintaining data accessible to print server 200. For example, storage device 230 may include one or more hard disk drives, solid state drives, tape drives, and/or any other storage devices. The storage devices may be located in print server 200 and/or in another device in communication with print server 200. As detailed above, storage device 230 may maintain printer data 232 and key data 234.

Upgrade server 250 may be any server accessible to printing devices (e.g., printing device A 260A, printing device N 260N) over the network 245 that is suitable for providing firmware upgrades. Upgrade server 250 may provide firmware upgrades that include public keys of key pairs generated by print server 200. In some cases, print server 200 may provide a public key to upgrade server 250 to initiate the generation and posting of a firmware upgrade that includes the public key.

Printing devices (e.g., printing device A 260A, printing device N 260N) may be local, networked, or cloud printing devices accessible to computing device 200 via the network 245. Each printing device (e.g., printing device A 260A, printing device N 260N) may be, for example, an inkjet printer, a laser printer, a solid printing fluid printer, an all-in-one printer, a snapshot printer, or any other printing device suitable for processing print jobs from computing devices. As discussed above, printing devices (e.g., printing device A 260A, printing device N 260N) may receive credentials from print server 200, where the credentials specify the printing services that the printing devices (e.g., printing device A 260A, printing device N 260N) are authorized to perform. Further, printing devices (e.g., printing device A 260A, printing device N 260N) may provide status information that includes various operating parameters to the print server 200. Communications between printing devices (e.g., printing device A 260A, printing device N 260N) and print server 200 may be secured and verified by using key pairs to perform public-key cryptography.

Printing devices (e.g., printing device A 260A, printing device N 260N) may also request and install firmware upgrades from upgrade server 250. For example, in response to receiving a notification that a current public key is deprecated from print server 200, a printing device (e.g., printing device A 260A, printing device N 260N) may request a firmware upgrade that includes a replacement public key from upgrade server 250.

FIG. 3 is a flowchart of an example method 300 for execution by server computing device 100 for updating key pairs based on digital signature states. Although execution of method 300 is described below with reference to server computing device 100 of FIG. 1, other suitable devices for execution of method 300 may be used, such as print server 200 of FIG. 2, Method 300 may be implemented in the form of executable instructions stored on a machine-readable storage medium, such as storage medium 120, and/or in the form of electronic circuitry.

Method 300 may start in block 305 and continue to block 310, where server computing device 100 send first credentials that are generated using a first private key to a printing device. Specifically, the first credentials may be signed with the first private key so that the printing device may verify the source of the first credentials using a first public key. In block 315, second credentials that are signed using the first private key and a second private key are sent to the printing device. In this case, the second credentials may be verified using either the first public key or a second public key. The second credentials may also notify the printing device that the first private key is deprecated.

Next, in block 320, after confirming a firmware upgrade has been installed on an upgrade threshold of printing devices, the first private key is deactivated. Once deactivated, the first private key is no longer used to sign credentials provided to the printing device, and future credentials are signed with the second private key. Method 300 may then continue to block 325, where method 300 may stop.

FIG. 4 is a flowchart of an example method 400 for execution by print server 200 for updating firmware on a print device during a key pair replacement. Although execution of method 400 is described below with reference to print server 200 of FIG. 2, other suitable devices for execution of method 400 may be used, such as server computing device 100 of FIG. 1. Method 400 may be implemented in the form of executable instructions stored on a machine-readable storage medium and/or in the form of electronic circuitry.

Method 400 may start in block 405 and proceed to block 410, where print server 200 may receive device status information from a printing device. The device status information may include information such as pages printed, printing fluid remaining, firmware version, a public key, etc. The device status information may be used by print server 200 to determine a quantity of printing services that the printing device is authorized to provide. In block 415, print server 200 determines if a current private key for signing credentials is obsolete. For example, the current private key may be compromised or expired. If the current private key is not obsolete, print server 200 sends server credentials signed with the current private key to the printing device in block 420. The server credentials may include the quantity of printing services that the printing device is authorized to provide.

If the current private key is obsolete, print server 200 sends server credentials signed with both the current private key and a replacement private key to the printing device in block 425. In this case, the printing device may verify the server credentials using either a current public key associated with the current private key or a replacement public key associated with the replacement private key. At some stage, new device status information is received from the printing device in block 430. Similar to block 410 above, print server 200 may use the new device status information to update the quantity of printing services that the printing device is authorized to provide.

In block 435, print server 200 determines if a firmware upgrade that includes the new replacement public key is available to the printing device. If the firmware upgrade is not available, method 400 returns to block 425, where print server 200 provides updated server credentials that are signed with the current private key and the replacement private key.

If the firmware upgrade is available, print server 200 provides updated server credentials that are signed with the current private key and the replacement private key along with a notification that the current key pair (i.e., current private key and current public key) is deprecated in block 440. The notification that the current key pair is deprecated notifies the printing device that the firmware upgrade is available. At this stage, the printing device may request the firmware upgrade so that the replacement public key can be installed in the firmware of the printing device.

In block 445, print server 200 determines if an upgrade threshold is satisfied. For example, the upgrade threshold may be satisfied if a predetermined proportion of the printing devices registered with print server 200 have installed the firmware upgrade with the replacement public key. If the upgrade threshold is not satisfied, method 200 returns to block 440, where print server 200 sends server credentials signed with both keys and a deprecated designation to the printing device.

If the upgrade threshold is satisfied, print server 200 sends server credentials signed with the replacement private key to the printing device in block 450. In this example, the previous private key may also be deactivated so that server credentials can no longer be signed with the previous private key. In some cases, the previous private key may be destroyed so that print server 200 does not have a copy of the deactivated key. The previous public keys may also be removed from the printing devices registered with print server 200. Method 400 may then continue to block 455, where method 400 may stop.

Figure 5:
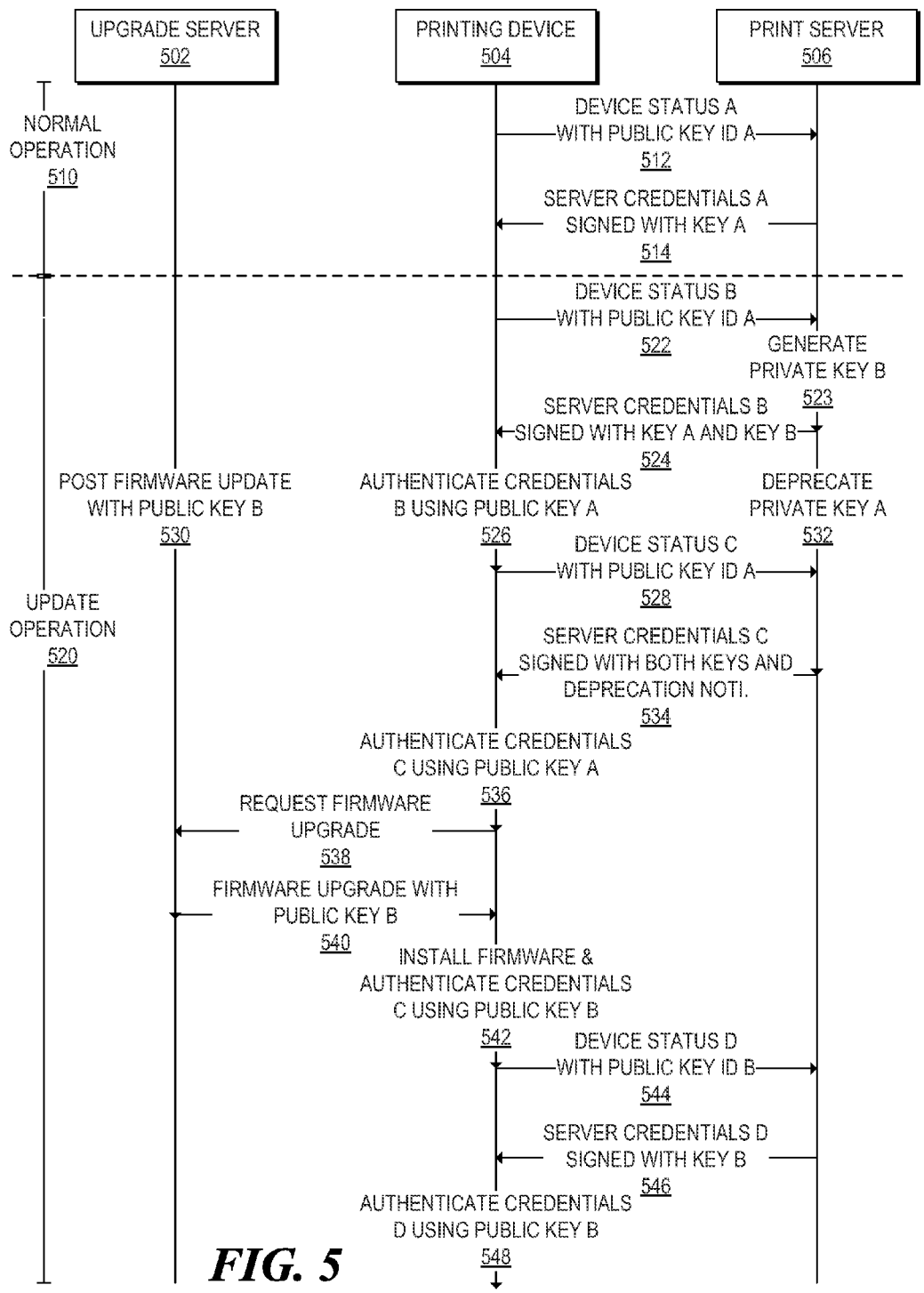
FIG. 5 is a system flowchart of an example method for updating key pairs based on digital signature states.

FIG. 5 is a system flowchart of an example method for updating key pairs based on digital signature states. Two phases of operation are shown in FIG. 5, normal operation 510 where the state of a key pair is active and update operation 520 where the key pair is deprecated and replaced.

During normal operation 510, printing device 504 initially sends device status information A that includes public key identifier A to print server 506 in step 512. The public key identifier A may be used by print server 506 to identify public key A, which is currently installed in firmware of printing device 504. Further, print server 506 may use device status information A to determine a quantity of printing services that printing device 504 is authorized to provide. In step 514, print server 506 sends server credentials A that are signed with private key A to printing device 504. Server credentials A may be verified by printing device 504 using public key A, where server credentials A include the quantity of printing services that printing device 504 is authorized to provide.

The normal operation 510 of printing device 504 and print server 506 may be repeated as long as the state of the key pair remains active. In this example, printing device 504 continues to provide updated device status information to notify print server 506 of printing services that have been provided. Print server 506 may monitor the printing services and modify the quantity of printing services authorized in the server credentials accordingly.

During update operation 520, printing device 504 initially sends device status information B that includes public key identifier A to print server 506 in step 522. Print server 506 may use device status information A to update the quantity of printing services that printing device 504 is authorized to provide. In step 523, print server 506 generates a replacement key pair that includes private key B and public key B. For example, print server 506 may generate the replacement key pair in response to a determination that private key A is compromised.

In step 524, print server 506 sends server credentials B that are signed with private key A and private key B to printing device 504. Server credentials B may be verified by printing device 504 using either public key A or public key B, where server credentials B include the updated quantity of printing services that printing device 504 is authorized to provide. In step 526, printing device 504 authenticates server credentials B using public key A. In step 528, printing device 504 sends device status information C that includes public key identifier A to print server 506.

At some stage, a firmware upgrade that includes public key B is posted on upgrade server 502 in step 530. The firmware upgrade may be posted at the request of print server 506, which may provide public key B to upgrade server 502 for including in the firmware upgrade. After the firmware upgrade is posted, print server 506 deprecates private key A in step 532. In step 534, print server 506 sends server credentials C that are signed with private key A and private key B to printing device 504, where the server credentials C include a notification that private key A is deprecated. In step 536, printing device 504 authenticate server credentials B using public key A.

In response to the notification that private key A is deprecated, printing device 504 requests the firmware upgrade from upgrade server 502 in step 538. In step 540, upgrade server 502 provides the firmware upgrade to printing device 540. Next, printing device 504 installs the firmware upgrade in step 542, After installing the firmware upgrade, printing device 504 may also authenticate server credentials B using public key B. Further, printing device 504 no longer has access to public key A because the firmware upgrade has overwritten the firmware and replaced public key A with public key B.

In step 544, printing device 504 sends device status information D that includes public key identifier B to print server 506. Print server 506 may use public key identifier B to determine that printing device 504 has installed the firmware upgrade. In step 546, print server 506 sends server credentials D that are signed with private key B to printing device 504. In step 548, printing device 504 authenticates server credentials B using public key B. At this stage, printing device 504 and print server 506 may return to normal operation 510 except that private key B and public key B are now used to authenticate messages between the devices.

The foregoing disclosure describes a number of example embodiments for updating key pairs based on digital signature states by a printing device and a print server. In this manner, the embodiments disclosed herein enable updating key pairs based on digital signature states by deprecating and replacing an initial key pair in stages that do not interrupt the operations of the printing device.

We claim:

1. A system for updating key pairs based on digital signature states, the system comprising:
    an interface module to:
        send first credentials that are signed by a first private key to a user computing device, wherein the first private key is associated with a first public key; and
        send second credentials to the user computing device, wherein the user computing device authenticates the second credentials using the first public key; and
    a key management module to:
        monitor an upgrade threshold that is satisfied when a firmware upgrade is installed on the user computing device and a plurality of user computing devices;
        in response to determining that the upgrade threshold is not satisfied, generate the second credentials that are signed by the first private key and a second private key, wherein the second credentials specify that the first private key is deprecated; and
        in response to determining the upgrade threshold is satisfied, deactivate the first private key; and
    wherein in response to a firmware upgrade request from the user computing device, the firmware upgrade comprising a second public key that is associated with the second private key is provided to the user computing device.

2. The system of claim 1, wherein the key management module is further to:
    generate, in response to determining that the first private key has been compromised, the second private key and the second public key.

3. The system of claim 1, wherein the user computing device is a printing device, and wherein the first credentials specify a quantity of printing services that the printing device is authorized to provide.

4. The system of claim 3, wherein the interface module is further to:
    receive a first device status message that includes printing statistics and a first public key identifier that is associated with the first public key, wherein the quantity of printing services is determined based on the printing statistics.

5. The system of claim 4, wherein the confirmation that the firmware upgrade is installed is included in a second device message as a second public key identifier that is associated with the second public key.

6. The system of claim 1, wherein the key management module is further to:
    destroy the first private key, wherein the first public key is destroyed on the user computing device and the plurality of user computing devices.

7. A method for updating key pairs based on digital signature states, the method comprising:
    sending first credentials that are signed by a first private key to a printing device, wherein the first private key is associated with a first public key, and wherein the first credentials specify a quantity of printing services that the printing device is authorized to provide;
    monitoring an upgrade threshold that is satisfied when a firmware upgrade is installed on the printing device and a plurality of printing devices;
    in response to determining that the upgrade threshold is not satisfied, generating second credentials that are signed by the first private key and a second private key, wherein the second credentials specify that the first private key is deprecated;
    sending the second credentials to the printing device, wherein the printing device authenticates the second credentials using the first public key;
    sending a second public key that is associated with the second private key to an upgrade server, wherein the upgrade server is to provide the firmware upgrade that includes the second public key; and
    in response to determining that the upgrade threshold is satisfied, deactivating the first private key.

8. The method of claim 7, further comprising:
    in response to determining that the first private key has been compromised, generating the second private key and the second public key.

9. The method of claim 7, further comprising:
    receiving a first device status message that includes printing statistics and a first public key identifier that is associated with the first public key, wherein the quantity of printing services is determined based on the printing statistics.

10. The method of claim 9, wherein the confirmation that the firmware upgrade is installed is included in a second device message as a second public key identifier that is associated with the second public key.

11. The method of claim 7, further comprising:
    destroying the first private key, wherein the first public key is destroyed on the printing device and the plurality of printing devices.

12. A non-transitory machine-readable storage medium encoded with instructions executable by a processor for updating key pairs based on digital signature states, the machine-readable storage medium comprising:
    instructions to receive a first device status message that includes printing statistics and a first public key identifier that is associated with a first public key, wherein the printing statistics are used to determine a quantity of printing services that a printing device is authorized to provide;
    instructions to send first credentials that are signed by a first private key to the printing device, wherein the first private key is associated with the first public key, and wherein the first credentials specify the quantity of printing services;
    instructions to monitor an upgrade threshold that is satisfied when a firmware upgrade is installed on the printing device and a plurality of printing devices;
    instructions to generate, in response to determining that the upgrade threshold is not satisfied, second credentials that are signed by the first private key and a second private key, wherein the second credentials specify that the first private key is deprecated; and
    instructions to send the second credentials to the printing device, wherein the printing device authenticates the second credentials using the first public key;
    instructions to send a second public key that is associated with the second private key to an upgrade server, wherein the upgrade server is to provide the firmware upgrade that includes the second public key; and
    instructions to deactivate, in response to determining that the upgrade threshold is satisfied, the first private key.

13. The storage medium of claim 12, further comprising instructions to:

generate, in response to determining that the first private key has been compromised, the second private key and the second public key.

14. The storage medium of claim 12, wherein the confirmation that the firmware upgrade is installed is included in a second device message as a second public key identifier that is associated with the second public key.

15. The storage medium of claim 12, further comprising instructions to:
 destroy the first private key, wherein the first public key is destroyed on the printing device and the plurality of printing devices.

* * * * *